United States Patent [19]
Schmitt et al.

[11] Patent Number: 6,122,165
[45] Date of Patent: Sep. 19, 2000

[54] COMPUTER WITH IMPROVED HARD DRIVE ASSEMBLY AND METHOD FOR ASSEMBLING SAME

[75] Inventors: Ty Schmitt, Round Rock; Brad Shelton, Cedar Park, both of Tex.

[73] Assignee: Dell Computer Corporation, Roundrock, Tex.

[21] Appl. No.: 09/189,603

[22] Filed: Nov. 10, 1998

[51] Int. Cl.[7] ..................................................... G06F 1/16
[52] U.S. Cl. ......................... 361/685; 361/679; 361/684; 361/685
[58] Field of Search .......................... 361/685, 679–686

[56] References Cited

U.S. PATENT DOCUMENTS

| | | | |
|---|---|---|---|
| D. 358,141 | 5/1995 | Peconne et al. .......................... D14/109 |
| 5,507,650 | 4/1996 | Larabell .................................... 439/61 |
| 5,566,383 | 10/1996 | Glidea et al. ............................. 361/685 |
| 5,586,003 | 12/1996 | Schmitt et al. .......................... 361/685 |
| 5,652,695 | 7/1997 | Schmitt .................................... 361/685 |
| 5,668,696 | 9/1997 | Schmitt .................................... 361/283 |
| 5,680,293 | 10/1997 | McAnally et al. ....................... 361/283 |
| 5,682,277 | 10/1997 | Hanson ................................ 360/97.07 |
| 5,768,099 | 6/1998 | Radloff .................................... 361/685 |

*Primary Examiner*—Leo P. Picard
*Assistant Examiner*—Yean-Hsi Chang
*Attorney, Agent, or Firm*—Haynes and Boone LLP

[57] ABSTRACT

A computer and a hard drive assembly for use therein according to which a drive unit is disposed on a carrier and engages a flexible wall of the carrier. The wall is adapted to flex to accommodate the drive unit when a dimension of the drive unit varies from a standard. An electomagnetic shield is connected to the carrier and the drive unit and is also adapted to accommodate dimensional variations in the drive unit.

23 Claims, 4 Drawing Sheets

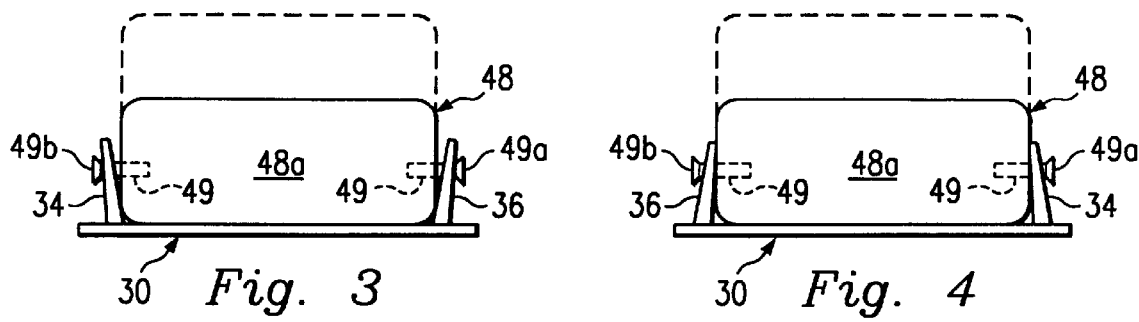
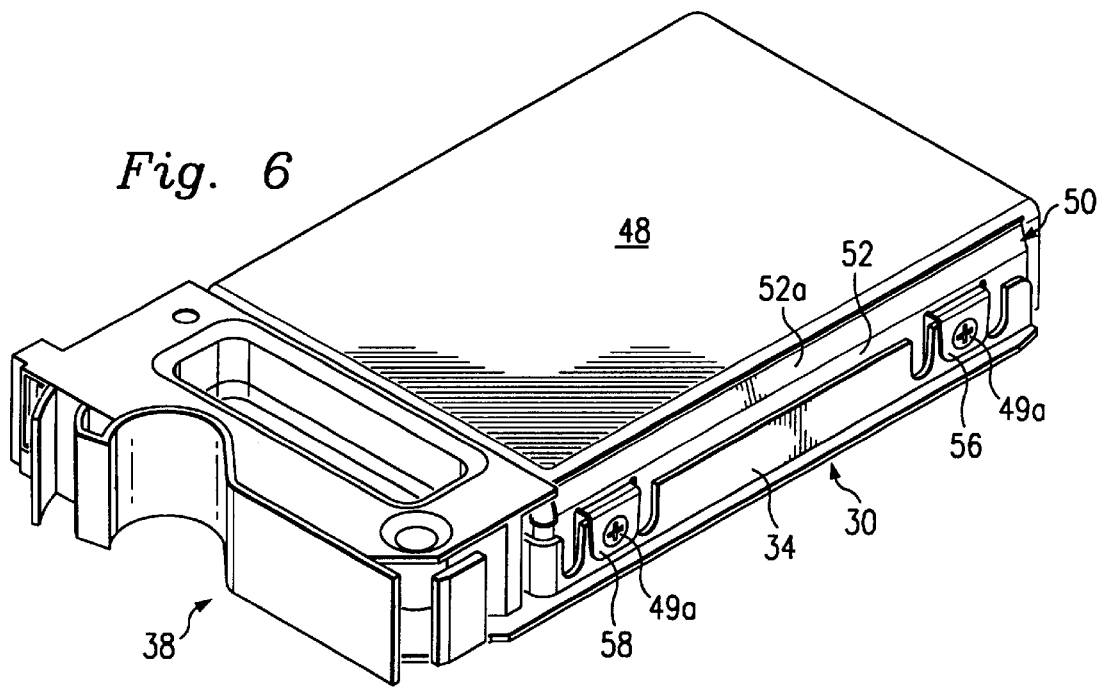
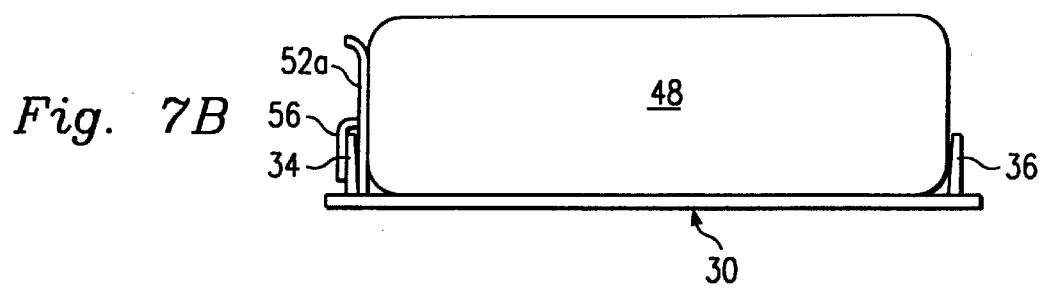

COMPUTER WITH IMPROVED HARD DRIVE ASSEMBLY AND METHOD FOR ASSEMBLING SAME

BACKGROUND

This disclosure relates, in general, to a computer, and, more particularly, to a computer having an improved hard drive assembly, and a method for assembling same.

A computer includes at least one hard drive assembly which contains permanent memory and which is disposed in the chassis of the computer. A typical hard drive assembly consists of a carrier that receives a drive unit and slides into a guide-rail assembly in an appropriate bay in the computer chassis. The drive unit includes a rigid housing containing the permanent memory and a motor for driving the unit. Also, a shield is often provided for shielding the permanent memory from electro-magnetic energy or interference (EMI) from the motor of the hard drive.

There are design problems associated with these types of hard drive assemblies. For example, the carrier must be sized to receive the housing in a relatively tight fit to prevent vibrations, etc. However, the housings of the drive units often have width dimensions tolerances that vary considerably between manufacturers and between families of drive units. In some cases, the difference between the widths at the base of the drives can be as much as 0.05 inches. Therefore, it is difficult to insure that the drive unit can be properly mounted in the carrier.

Also, industry standards provide for drive units having both a standard 1 inch and a 1.6 height, which compounds the above problem and leads to another problem in connection with the EMI shield. More, particularly, since the height of the shield is critical from both a shielding and a packaging standpoint, it is difficult, if not impossible, to maintain proper shielding and properly house the drive unit, yet accommodate both a 1 inch drive unit and a 1.6 inch unit.

Therefore, what is needed is a hard drive assembly including an EMI shield which can accommodate relatively large variations between width dimension tolerances in the drive units and variations in the standard heights of the units.

SUMMARY

To this end a hard drive assembly is provided that includes a drive unit that is disposed on a carrier and engages a flexible wall of the carrier. The wall is adapted to flex to accommodate the drive unit when a dimension of the drive unit varies from a standard. An electomagnetic shield is connected to the carrier and the drive unit and is also adapted to accommodate dimensional variations in the drive unit.

Advantages are achieved by the hard drive assembly and a computer incorporating same, since the hard drive carrier can accommodate drive units of different heights and widths, yet not compromise the EMI shielding. Also, the shield can be secured to the carrier and the drive unit without the use of any additional tools or fasteners.

BRIEF DESCRIPTION OF THE DRAWINGS

FIGS. 3 and 4 are end views of the hard drive assembly of FIG. 2 including a drive unit of two different widths, respectively.

FIG. 6 is an assembled view of the hard drive assembly and the shield of FIG. 5.

FIGS. 7A and 7B are end views of the carrier of the hard drive assembly and the shield of FIG. 6 shown without and with the drive unit, respectively.

DESCRIPTION OF THE PREFERRED EMBODIMENT

Figure 1:
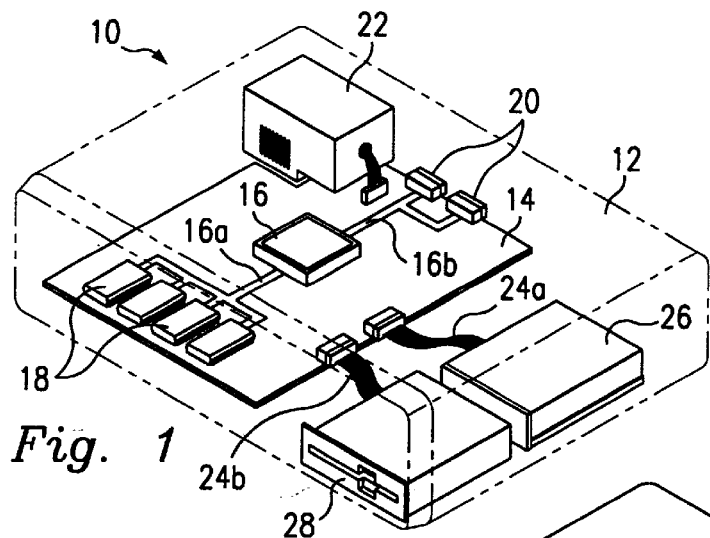
FIG. 1 is a diagrammatic view of a standard computer incorporating a hard drive assembly according to an embodiment of the present disclosure.

FIG. 1 depicts a personal computer, shown in general by the reference numeral 10, which can be in the form of a desktop computer, a laptop computer, a tower computer, a server, or the like. The computer 10 includes a chassis 12 in which a motherboard 14 is mounted. A processor 16, a plurality of memory modules 18, and two input/output (I/O) devices 20 are mounted on the motherboard 14. Two buses 16a and 16b are also provided on the motherboard 14 and connect the processor 16 to the memory modules 18 and to the input/output devices 20, respectively. A power supply 22 is connected to the motherboard 14, and a pair of cable assemblies 24a and 24b connect the motherboard to a hard drive assembly 26 and a disk drive unit 28, respectively. It is understood that other components, electrical traces, electrical circuits, and related devices (not shown) are provided in the chassis 12. Since these are all conventional, they will not be described in any further detail.

Figure 2:
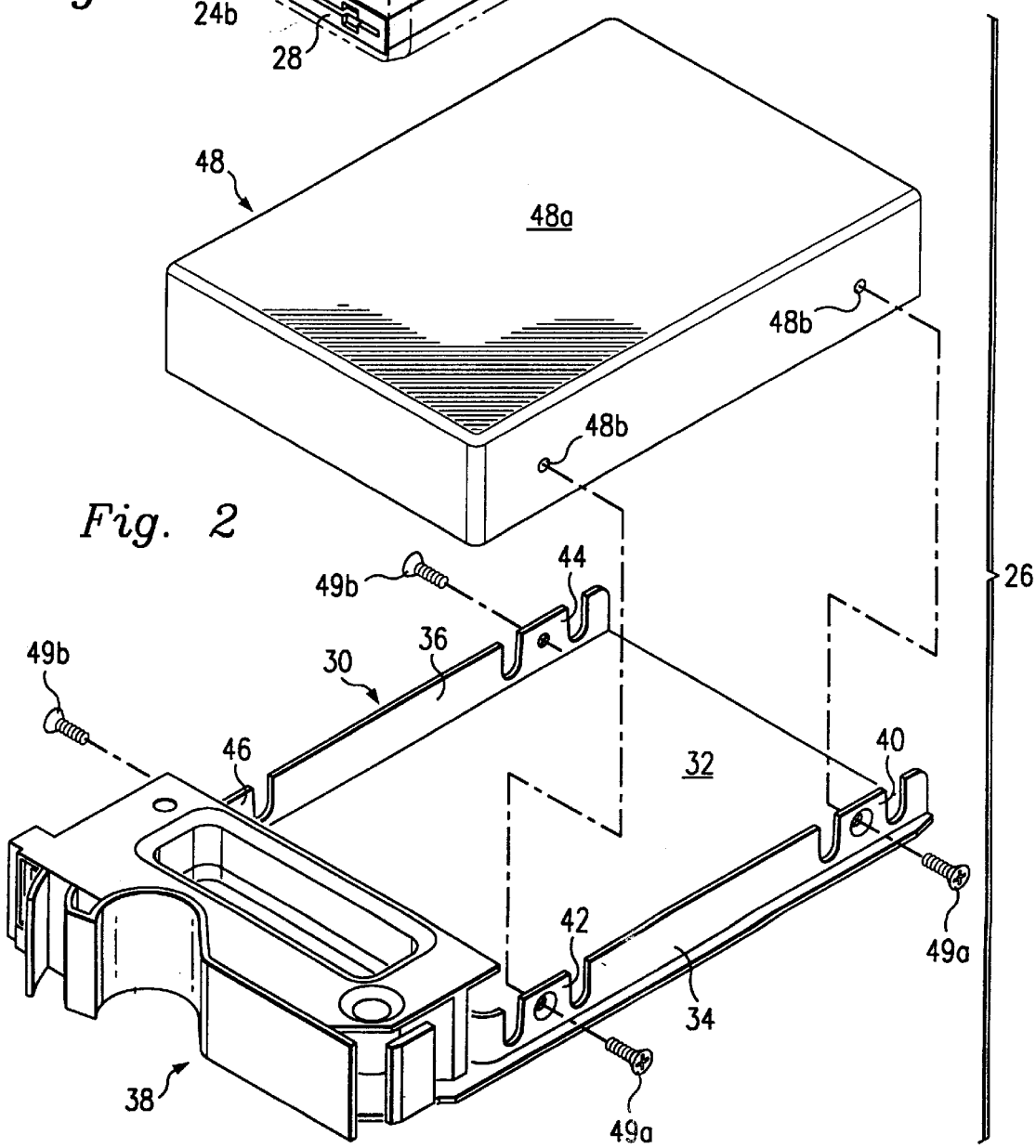
FIG. 2 is an enlarged exploded isometric view of the hard drive assembly of FIG. 1.

The hard drive assembly 26 is shown in detail in FIG. 2 and includes a carrier 30 which is formed by a base plate 32, two side walls 34 and 36 extending upwardly from the base plate as viewed in FIG. 2, and a housing 38 disposed at one end of the base plate. A motor (not shown) is mounted in the housing 38 and, since the specific configuration of the housing does not form a part of the present invention, it will not be described in any further detail.

A series of notches are cut in the side walls 34 and 36 to define two spaced flexible tabs 40 and 42 forming a part of the side wall 34, and two spaced flexible tabs 44 and 46 forming a part of the side wall 36. An opening, which is preferably countersunk, is formed through each of the tabs 40, 42, 44, and 46. In addition to forming the flexible tabs 40, 42, 44, and 46, the above-mentioned notches in the side walls 34 and 36 render the remaining portions of the side walls relatively flexible.

A drive unit 48 is mounted in the carrier 30 and has a rigid housing 48a having two spaced internally threaded openings 48b formed in each side wall with the openings in one side wall being shown in FIG. 2. The housing 48a is adapted to rest on the carrier base plate 32 and extend between the side walls 34 and 36 in a relatively tight fit, with the corresponding end of the housing 48a extending adjacent the rear wall of the housing 38. Two screws 49a extend through the openings in the tabs 40 and 42, and into the corresponding openings 48b formed in one side wall of the housing 48a, and two screws 49b extend through the openings in the tabs 44 and 46, and into corresponding openings formed in the other side wall of the housing 48a. The drive unit 48 is conventional and, as such, contains permanent memory and is adapted to be driven by the motor disposed in the carrier housing 38.

FIG. 3 depicts the drive unit 48 inserted in the carrier 30 and, for the purposes of example, it is assumed that the housing 48a of the drive unit has a width slightly greater than the standard width for such units, due to variations in manufacturing tolerances. Due to the above-mentioned flexibility of the side walls 34 and 36, including the tabs 40, 42, 44, and 46, the side walls are adapted to flex slightly outwardly from a vertical plane as viewed in FIG. 3. Thus, the drive unit housing 48a can be accommodated in the carrier.

FIG. 4 depicts the drive unit 48 inserted in the carrier 30 and, for the purposes of example, it is assumed that the housing 48a of the drive unit has a width slightly less than the standard width for such units, due to variations in tolerances. Due to the flexibility of the side walls 34 and 36, including the tabs 40, 42, 44, and 46, the walls are adapted to flex slightly inwardly from a vertical plane as viewed in FIG. 4 when the screws 49a and 49b are driven through the openings in the tabs 40, 42, 44, and 46 and into the corresponding openings 48b, formed in the respective side walls of the housing 48a. Thus, the carrier 30 can easily accommodate drive units 48 having varying widths.

Also, since the design is such that the side walls 34 and 36, including the tabs 40, 42, 44 and 46, engage the lower portion of the corresponding side walls of the drive unit housing 48a, drive units 48 of different heights can be accommodated. More particularly, the carrier 30 can accommodate drive unit housings having a standard 1.0 inch height as shown by the solid lines in FIGS. 3 and 4 and, in addition, housings having different heights, such as a standard 1.6 inch height as shown by the dashed lines.

Figure 5:
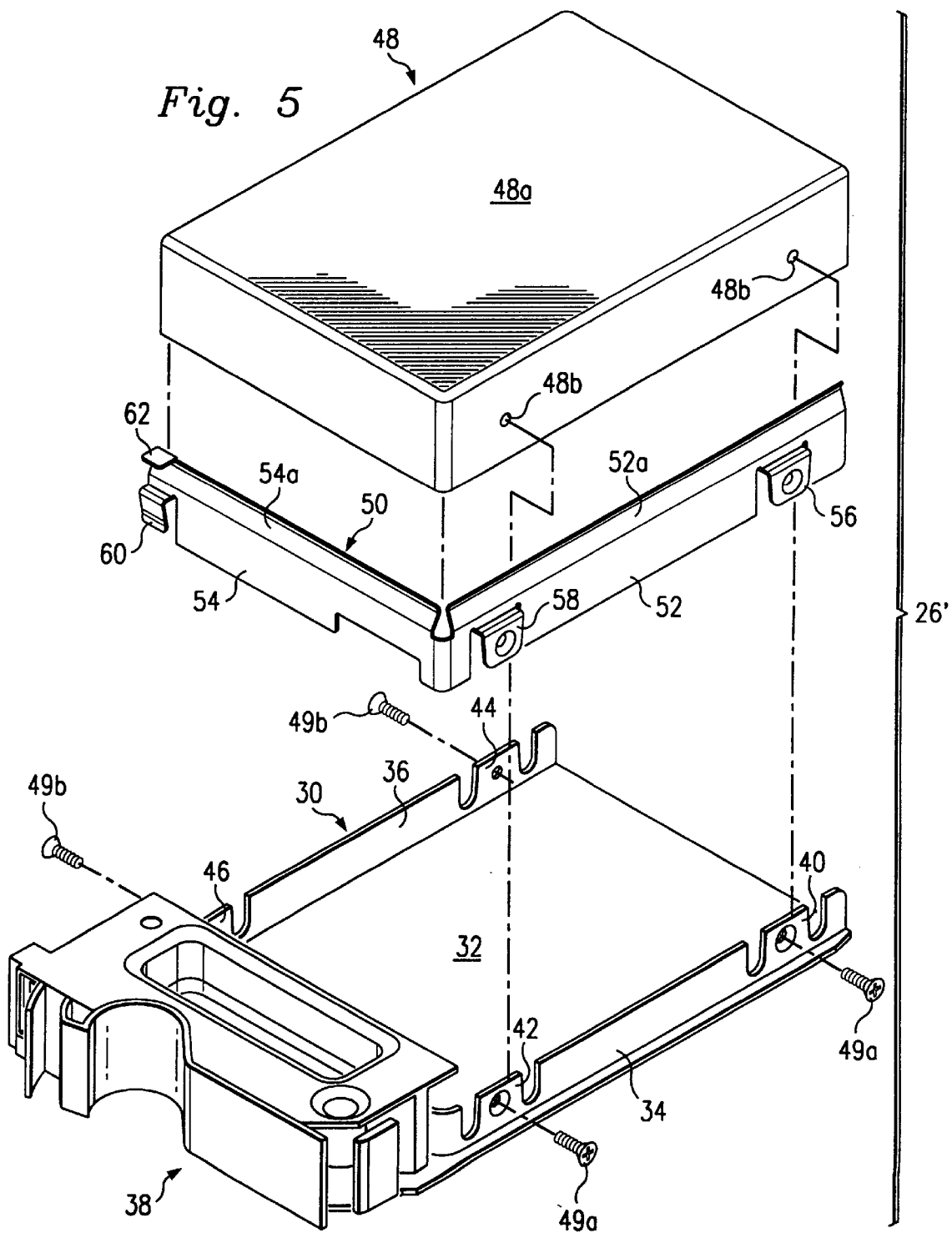
FIG. 5 an enlarged exploded isometric view of the hard drive assembly of FIG. 2 and an EMI shield.

An alternate embodiment of the hard drive assembly is shown, in general, by the reference numeral 26' in FIG. 5. The assembly 26' consists of the carrier 30 and the drive unit 48 of the embodiment of FIGS. 1–4, the components of which are reference by the same numerals. According to the embodiment of FIG. 5, an L-shaped shield 50 is also provided and is formed by two elongated plates 52 and 54 connected at their corresponding ends and extending at right angles to each other. Preferably, the plates 52 and 54 are formed integrally by bending a single plate at a right angle.

A pair of spaced tabs 56 and 58 are formed on the plate 52 by making appropriate cuts in the plate to form the tabs and then bending the tabs outwardly and downwardly as shown. Each tab 56 and 58 has a through opening that is similar in size to the openings formed through the tabs 40 and 42, respectively of the carrier 30. A tab 60 is formed on the plate 54 and is similar to the tabs 56 and 58 but doesn't have a through opening. The upper edge portions of the plates 52 and 54 are bent inwardly as shown by the reference numerals 52a and 54a, respectively, and a horizontally extending, outwardly-projecting tab 62 is formed on the edge portion 54a.

The hard drive assembly 26' is assembled by initially lowering the shield 50 onto the carrier 30, as viewed in FIG. 5, until the lower edges of the plates 52 and 54 rest on the base plate 32 of the carrier, and the tabs 56 and 58 of the of the shield extend over the tabs 40 and 42, respectively, of the carrier with their respective openings in alignment. In this position, the tab 60 is place in tension against a corresponding surface (not shown) formed on the rear end of the housing 38 of the carrier, and the tab 62 extends in a corresponding slot in the latter surface.

The drive unit 48 is then lowered onto the carrier 30 until the lower surface of the housing 48a of the drive unit engages the upper surface of the base plate 32 of the carrier.

In this position, the openings 48b in the respective side walls of the housing align with the respective openings in the tabs 40, 42, 44, 46 of the carrier and with the openings in the tabs 56 and 58 of the shield 50, as shown in assembled position of FIG. 6. The screws 49a are then inserted through the aligned openings in the tabs 40 and 42, and the tabs 56 and 58, respectively, and into the openings 48b of the corresponding side wall of the housing 48a. The screws 49b are inserted through the openings in the tabs 44 and 46 and directly into the openings in the other side wall of the drive unit housing 48a.

FIG. 7A depicts the aforementioned inwardly-bent upper edge portion of the plate 52 and 54 when the drive unit 48 is not received in the carrier 30, while FIG. 7B shows the latter edge portion engaging the corresponding side wall of the housing 48a of the drive unit 48 when the drive unit is mounted in the carrier. The design is such that the edge portion 52a is urged to a substantially vertical portion in line with the plane of the plate 52, and is thus placed in tension, by the housing 48 so as to firmly engage the housing and eliminate any gaps that would otherwise occur. Although not shown in the drawings, it is understood that the inwardly bent upper edge portion 54a of the plate 54 engages the corresponding end of the housing 48a of the drive unit 48 in a similar manner. Of course, the side wall 36 can flex in the manner discussed above. This enables the carrier 30, with its flexible side walls 34 and 36; and the shield 50, with its flexible bent edge portions 52a and 54a, to accommodate drive units of varying widths and lengths.

Figure 8:
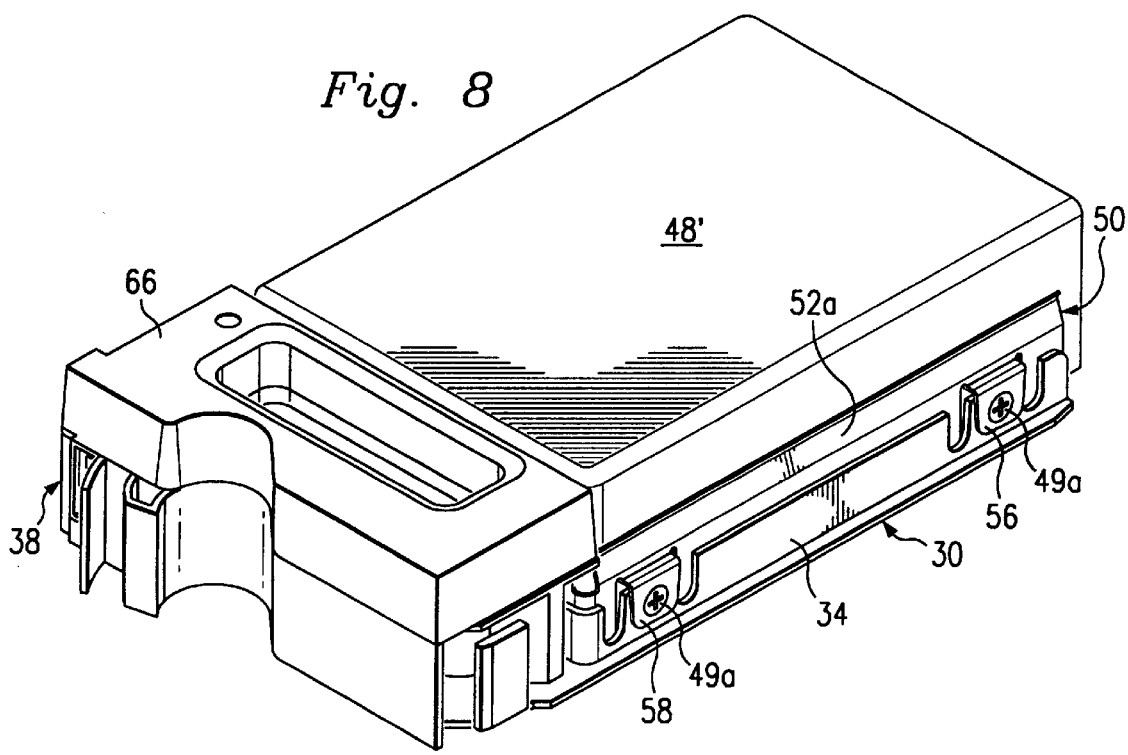
FIG. 8 is view similar to that of FIG. 6 but showing a hard drive assembly having a drive unit of a greater height than the drive unit of the assembly of FIG. 5.
Figure 9A:
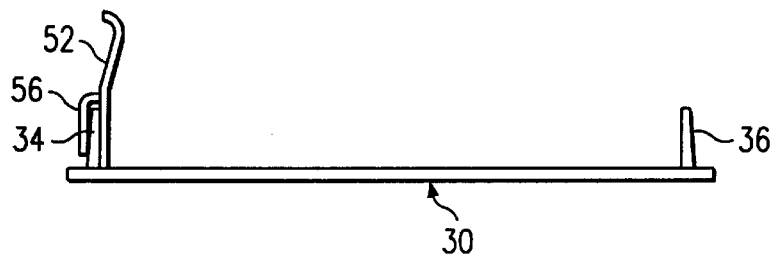
FIGS. 9A and 9B are end views of the carrier of the hard drive assembly and the shield of FIG. 8 shown without and with the drive unit, respectively.
Figure 9B:
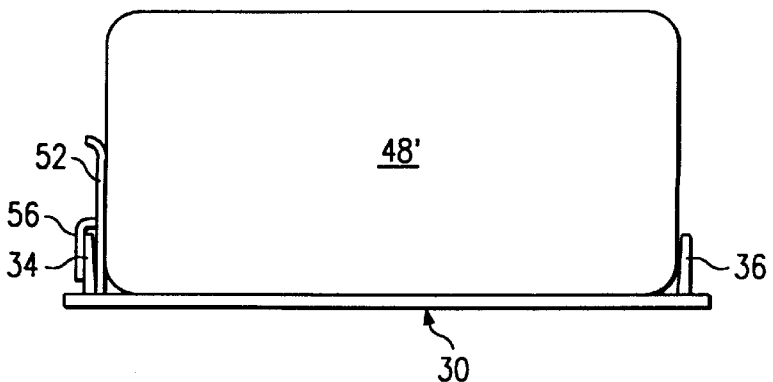

The drive unit 48 of the embodiment of FIGS. 5–7 has a standard height of 1.0 inch, while FIGS. 8, 9A, and 9B depict the carrier 30 and the shield 50 of the embodiment of FIGS. 5–7 assembled with a drive unit 48' having standard height of 1.6 inches. In this embodiment, the carrier 30 and the shield 50 are identical to those of the previous embodiments with the exception that a false, or dummy, housing 66 is stacked on top of the housing 38 of the carrier 30 for aesthetic purposes. The bent upper edge portions 52a and 54a of the plates 52 and 54, respectively, of the shield 50 engage the lower portion of the corresponding side walls of the drive unit 48' in the manner discussed above. Therefore, as in the arrangement of FIGS. 5–7, the plates 52 and 54 are placed in tension by the drive unit 48' so as to firmly engage the housing and eliminate any gaps therebetween, while the side wall 36 can flex in the manner discussed above. Also, as shown in FIGS. 8, 9A, and 9B, drive units of varying heights can be accommodated.

Thus, significant advantages are gained by the above embodiments since drive units having varying dimensions can be accommodated even if a EMI shield is used. Also, the shield can be installed without any extra fasteners or tools, and the plates of the shield are preloaded against the corresponding walls of the drive unit to promote the containment of the EMI emissions and eliminate any gaps therebetween.

It is understood that several variations may be made in the foregoing without departing from the scope of the invention. For example, the number of tabs formed in the carrier side walls and in the shield can be varied withing the scope of the invention.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A computer comprising at least one memory; at least one storage; and at least one hard drive assembly comprising a carrier comprising at least one wall having at least one tab; a drive unit disposed on the carrier; an electromagnetic interference shield extending between the wall and a corresponding surface of the drive unit, the shield adapted to flex to accommodate the drive unit and comprising at least one tab that extends over a corresponding tab of the side wall; and fastening means extending through corresponding aligned openings in the tabs and in the drive unit to secure the drive unit to the carrier.

2. The computer of claim 1 wherein the wall is a side wall and wherein the carrier comprises another side wall in a spaced relation with the first-mentioned side wall so that the drive unit extends between the walls in engagement therewith.

3. The computer of claim 2 wherein the other side wall is also flexible to assist in accommodating the drive unit when a dimension of the drive unit varies from a standard.

4. The computer of claim 3 wherein the side wall has at least one notch formed therein to render it flexible.

5. The computer of claim 4 wherein the side wall has at least two notches formed therein and includes at least one tab formed between the notches, and further comprising fastening means extending through aligned openings in each tab and in the drive unit to fasten the drive unit to the carrier.

6. The computer of claim 5 wherein, if the dimension of the drive unit is less than the standard, the fastening means associated with each tab flexes the tab towards the drive unit.

7. The computer of claim 5 wherein, if the dimension of the drive unit is greater than the standard, the drive unit flexes the side wall outwardly.

8. The computer of claim 1 wherein the carrier can accommodate drive units of varying heights.

9. A hard drive assembly for a computer, the assembly comprising a carrier comprising at least one wall having at least one tab; a drive unit disposed on the carrier; an electromagnetic interference shield extending between the wall and a corresponding surface of the drive unit, the shield adapted to flex to accommodate the drive unit and comprising at least one tab that extends over a corresponding tab of the wall; and fastening means extending through corresponding aligned openings in the tabs and in the drive unit to secure the drive unit to the carrier.

10. The assembly of claim 9 wherein the wall is a side wall and wherein the carrier comprises another side wall in a spaced relation with the first-mentioned side wall so that the drive unit extends between the walls in engagement therewith.

11. The assembly of claim 10 wherein the other side wall is also flexible to assist in accommodating the drive unit when a dimension of the drive unit varies from a standard.

12. The assembly of claim 10 wherein the side wall has at least one notch formed therein to render it flexible.

13. The assembly of claim 12 wherein the side wall has at least two notches formed therein and includes at least one tab formed between the notches, and further comprising fastening means extending through aligned openings in each tab and in the drive unit to secure the drive unit to the carrier.

14. The assembly of claim 13 wherein, if the dimension of the drive unit is less than the standard, the fastening means associated with each tab flexes the tab towards the drive unit.

15. The assembly of claim 13 wherein, if the dimension of the drive unit is greater than the standard, the drive unit flexes the side wall outwardly.

16. The assembly of claim 9 wherein the carrier can accommodate drive units of varying heights.

17. A method for assembling a hard drive assembly for a computer, the method comprising the steps of providing a carrier with at least one wall, locating a EMI shield against one of the walls, bending a portion of the shield inwardly, placing the drive unit of the assembly adjacent the shield so that the bent portion of the shield engages a corresponding portion of the drive unit to pre-load the bent portion, forming aligned openings in the one wall, the shield and the drive unit, and inserting a fastening means through the aligned openings to fasten the carrier to the drive unit.

18. The method of claim 17 wherein, if the dimension of the drive unit is less than the standard, the fastening means associated with each tab flexes the tab towards the drive unit.

19. The method of claim 17 wherein, if the dimension of the drive unit is greater than the standard, the drive unit flexes the side wall outwardly.

20. A computer comprising at least one memory; at least one storage; at least one hard drive assembly comprising a carrier comprising at least one wall having at least one tab, a drive unit disposed on the carrier and extending between the walls; a shield comprising at least one plate extending between at least one of the walls and a corresponding surface of the drive unit, and at least one tab that extends over a corresponding tab of the wall; and fastening means extending through aligned openings in the tabs and in the drive unit to secure the drive unit to the carrier, the height of the plate being less than that of the drive unit so as to accommodate drive units of varying heights.

21. The computer of claim 20 wherein the carrier has two spaced side walls and a housing having a wall extending perpendicular to the side walls, and wherein the shield is L-shaped and comprises two plates which extend adjacent one side wall of the carrier and the wall of the housing, respectively, the two plates engaging two corresponding walls of the drive unit.

22. A hard drive assembly comprising a carrier comprising at least one wall having at least one tab formed between the notches; a drive unit disposed on the carrier and extending between the walls; and a shield comprising at least one plate extending between at least one of the walls and a corresponding surface of the drive unit and adapted to flex to accommodate the drive unit, the plate including at least one tab that extends over a corresponding tab of the side wall, and fastening means extending through aligned openings in the tabs and in the drive unit to secure the drive unit to the carrier, the height of the plate being less than that of the drive unit so as to accommodate drive units of varying heights.

23. The assembly of claim 22 wherein the carrier has two spaced side walls and a housing having a wall extending perpendicular to the side walls, and wherein the shield is L-shaped and comprises two plates which extend adjacent one side wall of the carrier and the wall of the housing, respectively, the two plates engaging two corresponding walls of the drive unit.

* * * * *

UNITED STATES PATENT AND TRADEMARK OFFICE
CERTIFICATE OF CORRECTION

PATENT NO.   : 6,122,165
DATED        : September 19, 2000
INVENTOR(S)  : Schmitt et al.

It is certified that error appears in the above-identified patent and that said Letters Patent is hereby corrected as shown below:

Column 6,
Lines 17 and 20, after "than", delete "the", and insert -- a --.

Signed and Sealed this

Twenty-third Day of July, 2002

Attest:

Attesting Officer

JAMES E. ROGAN
Director of the United States Patent and Trademark Office